United States Patent [19]

Sobotta

[11] 4,165,927

[45] Aug. 28, 1979

[54] PHOTOGRAPHIC SLIDE PROJECTOR

[75] Inventor: Reinhard Sobotta, Brunswick, Fed. Rep. of Germany

[73] Assignee: Rollei-Werke Franke & Heidecke, Brunswick, Fed. Rep. of Germany

[21] Appl. No.: 798,360

[22] Filed: May 19, 1977

[30] Foreign Application Priority Data

May 22, 1976 [DE] Fed. Rep. of Germany ....... 2623154

[51] Int. Cl.² .............................................. G03B 23/00
[52] U.S. Cl. .................................................... 353/104
[58] Field of Search ............... 353/104, 114, 115, 116, 353/117, 118

[56] References Cited

U.S. PATENT DOCUMENTS

| Re. 27,503 | 10/1972 | Gould et al. ......................... 353/116 |
| 1,159,681 | 11/1915 | Kastner ................................. 353/116 |
| 2,878,604 | 3/1959 | Mulch ................................... 353/115 |
| 3,830,566 | 8/1974 | Bennett ................................. 353/116 |

Primary Examiner—Steven L. Stephan
Attorney, Agent, or Firm—Stonebraker, Shepard & Stephens

[57] ABSTRACT

A slide projector having resilient flexible elements mounted on the projector to engage the edges of slides in magazine compartments next to the compartment from which a slide is to be withdrawn or to which a projected slide is to be returned, for shifting the slides in the adjacent compartments to upright positions flat against the partition walls of the magazine, so that they will not tilt to positions overlying the compartment from which a slide is to be withdrawn or to which it is to be returned, thus avoiding possible interference with the withdrawal or return.

10 Claims, 6 Drawing Figures

PHOTOGRAPHIC SLIDE PROJECTOR

BACKGROUND OF THE INVENTION

This invention relates to photographic slide projectors, and more particularly to means for straightening the picture slides in the compartments of the magazine adjacent to the compartment from which a slide is to be removed for projection, or to which it is to be returned after projection.

The compartments of slide magazines are frequently made sufficiently thick so that they can receive slides in plastic mounts, or slides mounted between glass plates. However, when such magazines are used with slides mounted in the usual cardboard mounts, which are much thinner than plastic mounts or glass mounted slides, then difficulties are encountered. The thinner cardboard mount has so much play in the compartment that it may tilt far enough to bring the upper portion of the slide in one compartment in overlying relation to the next adjacent compartment. If a slide in a compartment next to the one from which a slide is to be removed or returned, tilts far enough to lean over the space of the compartment out of which or into which a slide is to be moved, the overhanging slide from the next compartment may interfere with the proper operation of the slide transfer member attempting to remove a slide, and may block the insertion of a slide attempted to be replaced in its proper compartment. This blocking of the return of a slide is particularly serious, since the slide transfer mechanism moves relatively rapidly, and if the slide attempted to be returned butts against an overhanging part of a slide from the next adjacent compartment, both slides are likely to be damaged or destroyed, and there is the further possibility of serious damage to the slide transfer mechanism.

This excessive and dangerous tilting of a thin slide in a thick compartment of the magazine occurs particularly with magazines of the type having a slot in the bottom of the magazine, and a fixed ramp which engages the bottom edges of the slides as the magazine moves, raising the slides as they successively reach the location at which they are to be withdrawn for projection. Such magazines usually have one side wall which is relatively low, and the ramp lifts the slide up high enough so that the bottom edge of the slide is at or above the elevation of the top edge of the low wall of the magazine, so that the slide may be moved horizontally from the magazine to the film gate or projection gate of the projector. When the slide is not engaged with the elevating ramp, it is sufficiently low so that the partitions between successive compartments will maintain the slides against excessive tilting. But when the slide is raised by the ramp to a higher elevation, a much larger part of the height of the slide is above the top edge of the partition, and hence the slide can tilt to a great extent, if the slide is relatively thin, such as a cardboard mounted slide, and if the compartment receiving the slide is relatively thick, such as a compartment adapted to receive plastic mounted or glass mounted slides.

The present invention overcomes the difficulty caused by tilting of the thin slides in the thick compartments, by providing, on the projector, resilient flexible elements such as brushes, which engage the edges of the successive slides as the magazine moves, and which shift the slides to an upright position tight against one of the upright partition walls which form the compartments. This shifting of the tilted slides to an upright position occurs as the slides arrive at a position where excessive tilting would be harmful. Other slides, at a distance from the compartment from or to which a slide is being moved, are free to tilt, since tilting of these other slides is not harmful.

DESCRIPTION OF THE PREFERRED EMBODIMENT

Figure 1:
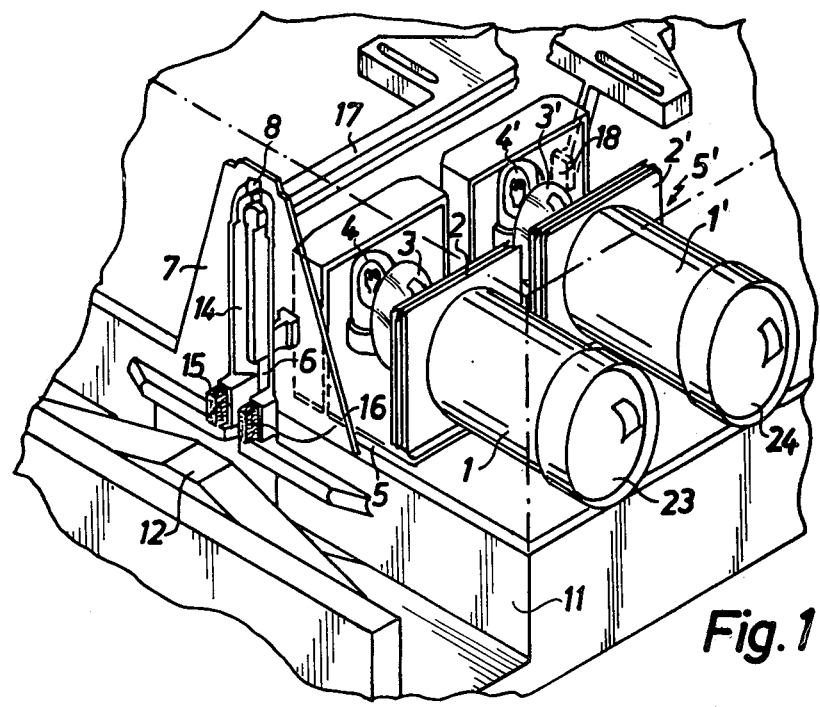
FIG. 1 is a perspective view of a fragment of a slide projector according to a preferred embodiment of the invention.

In FIG. 1 there is shown somewhat schematically a portion of a photographic slide projector of the kind called a dual or twin projector, for alternate projection of slides taken from a single magazine. Such projectors are known in the art. An example of such a projector is disclosed in Sobotta U.S. Pat. No. 3,847,472, granted Nov. 12, 1974, the disclosure of which is incorporated herein by reference.

When slides are arranged in a magazine in correct order in which they are to be projected, and are to be returned to the magazine still in correct order, after being projected in a dual projector, it is necessary that the magazine be advanced in what is called a "pilgrim step" movement, that is, two steps forward, one step back, again two steps forward, and one step back again. This is explained in the copending patent application of Reinhard Sobotta, Ser. No. 725,140, filed Sept. 17, 1976. The present invention is applicable to dual projectors in which the magazine is moved by pilgrim steps, as will be shown in connection with FIGS. 4 and 5 of the present drawings, but the invention is also applicable to ordinary single projectors where the magazine is advanced in a single direction, one step at a time, without any retrograde steps as will be shown in connection with FIG. 6 of the present drawings.

Referring again to FIG. 1, the dual projector here shown as a preferred embodiment of the invention has two projection lenses 1 and 1' with their optical axes parallel to each other, these projection lenses being arranged in front of respective projection units 5 and 5'. Each projection unit comprises a projection gate or slide holder, shown at 2 and 2', respectively, and respective condenser lenses 3 and 3' behind the projection gates and in front of respective projection lamps 4 and 4'. The two projection units, including the projection gates 2 and 2', move forwardly and rearwardly during the projection cycle, as explained in U.S. Pat. No. 3,847,472, but the projection lenses 1 and 1' preferably remain stationary. The purpose of the forward and rearward movement, as will be apparent from the patent just mentioned, is to bring the respective projection gates 2 and 2' into the slide changing plane indicated in general at 6, for insertion of slides into and removal of slides from the projection gate. This slide changing plane 6 must be rearwardly of the forward or projection position of each projection unit, in order that the first projection unit, closest to the slide magazine, will not interfere with transfer of slides from the magazine to the projection gate of the second projection unit, or vice versa, when the first unit is projecting and the second unit is being loaded or unloaded.

A plate 7 on the side of the projector closest to the magazine has a slot 8 aligned with the changing plane 6. A slide changer of any convenient known form, indicated schematically at 9, operates in the conventional way through the slot 8, engages a picture slide in the magazine and transfers it to one or the other of the projection gates 2 or 2', as the case may be, and later, when projection of this slide is completed, moves the slide back from the projection gate into its original compartment in the magazine. Various forms of slide changers are known in the art, and any convenient one may be used, the details of the slide changer being unimportant so far as the present invention is concerned. Examples of slide changers are disclosed in Sobotta U.S. Pat. No. 3,790,269, granted Feb. 5, 1974, and Sobotta U.S. Pat. No. 3,847,473, granted Nov. 12, 1974.

Figure 2:
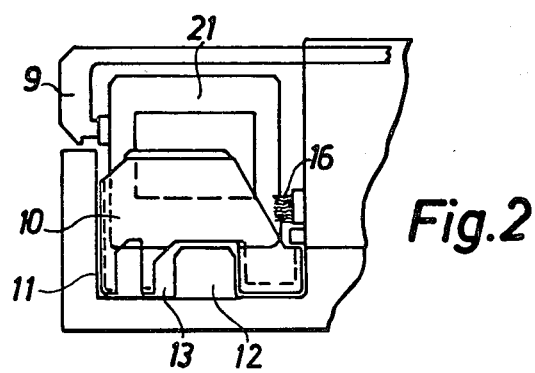
FIG. 2 is a view partly in vertical section and partly in elevation, illustrating details of a fragment of the projector, and the magazine, and associated parts.

A slide magazine indicated in general at 10 (FIG. 2) is displaceable along the track or guideway 11 (FIGS. 1 and 2). A stationary ramp 12 in the guideway 11 extends upwardly through a slot 13 in the bottom of the magazine, and engages the bottom edges of the slides as they successively approach the slide changing plane 6, so that by the time any particular slide has arrived at the changing plane, it has been elevated in its compartment of the magazine to an elevation where the bottom edge of the slide is at least as high as the top edge of the low side wall of the magazine, on the side thereof which is toward the projector. Then the gripper portion 17 of the slide changer 9 can grip the slide which is to be transferred from the magazine to the projector and can move it horizontally into the proper projection gate of the projector, since the bottom edge of the slide is high enough to clear the top edge of the side wall of the magazine.

The parts thus far described are conventional, and the details thereof are unimportant so far as the present invention is concerned, and are subject to wide variation within the skill of the art.

As already mentioned, the present invention deals with straightening the slides to an upright position in their respective compartments of the magazine, to prevent adjacent slides from tilting to a position leaning over the compartment which is located at the slide changing plane. This is accomplished, according to the present invention, by providing resilient flexible elements 15 and 16, projecting from the side of the projector into position to engage slightly with the edges of slides during the feeding movement of the magazine. Conveniently these resilient flexible elements 15 and 16 are formed as brushes having bristles protruding horizontally toward the magazine as illustrated in FIGS. 1 and 2, on opposite sides of the opening 8 through which the slide changing gripper operates. These brushes 15 and 16 may be conveniently mounted on a synthetic plastic frame member 14 attached to the plate 7 and forming a frame or molding around the slot 8.

In place of bristle brushes, plush strips with appropriate high pile of long firm hairs may be used.

The slide changer 9 conveniently comprises the gripper portion 17 already mentioned, for withdrawing slides from the magazine and inserting them into the projection gate, and a push member 18 for returning the slides into the magazine with projection is completed, this push member 18 simply pushing a slide before it, the slide merely being guided through the plastic frame 14 and into the appropriate compartment of the magazine.

Figures 3, 4:
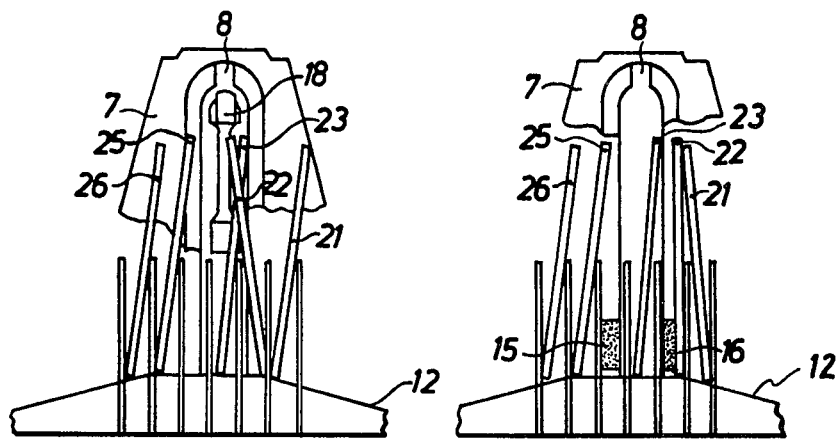
FIG. 3 is a schematic representation of the possible position of slides in a projector not equipped with the present invention, showing the way in which adjacent slides may tilt to interfere with each other.
FIG. 4 is a view similar to FIG. 3, illustrating the upright position of the slides as a result of the positioning means of the present invention, when used with a dual projector arranged to feed the magazine through "pilgrim" steps.

FIG. 3 illustrates a situation likely to occur when the flexible resilient means of the present invention is not employed, and when thin slides, such as slides in cardboard mounts, are arranged in compartments which are thick enough (in the direction of travel of the magazine) to accommodate slides in thick plastic mounts or glass mounts. For example, in FIG. 3 it will be seen that the slides 21, 22, 23, 25, and 26 may be tilted or cocked to a substantial extent, especially when raised on the ramp 12, the slide 22 tilting over to such an extent that it partially overlies the compartment for the next slide 23. Now if this slide 23 has been in the projector and is to be returned to its compartment, it is seen from FIG. 3 that it may collide with the slide 22 of the next adjacent compartment, causing damage to both slides and to the slide changing mechanism.

Figures 5, 6:
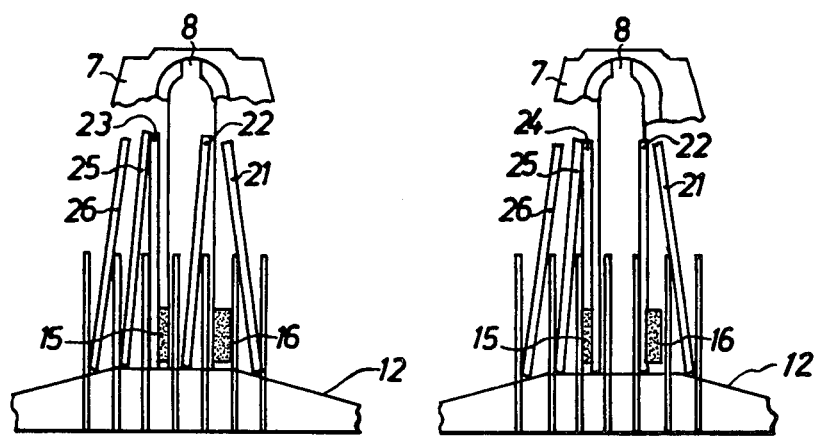
FIG. 5 is a similar view showing a different position of the parts.
FIG. 6 is a similar view showing the action of the present invention when used with a projector of the single projection type.

In contrast to this undesirable condition, consider now the condition occurring when the flexible resilient means 15, 16 of the present invention is used, as indicated in FIGS. 4 and 5. In FIG. 4, assume that the magazine has just moved in a leftward direction to bring the compartment for slide 23 into the changing plane so that this slide, previously projected, can be pushed back into its proper compartment. During this leftward movement of the magazine, immediately before reaching the position illustrated in FIG. 4, the flexible resilient member 16 will have engaged the adjacent edge of the slide 22 and will have applied gentle pressure to this slide to bring it tight against the vertical partition at the right side of its compartment. This brings the slide 22 to a vertical position so that it does not overlie any part of the next compartment to the left, thereby leaving the next compartment entirely clear for receiving the slide 23 when it is moved back into this compartment, without danger of collision with the slide 22.

It may be convenient to describe a typical cycle of operation. Assume, for example, that the slides 23 and 24 are in the projection gates of the projection units 5 and 5', respectively, and that the slide 23 has been projected for the desired time. Operation of a suitable switch or key on the projector then initiates a new cycle. The projection lamp 4 of the slide 23 is extinguished and the projection lamp 4' of the slide 24 is illuminated, so that the slide 24 is now projected. The projection unit 5 now travels backward along its optical axis, until the projection gate 2 thereof comes to the slide changing plane 6. The gripper 17 of the slide changing mechanism slides through the empty magazine compartment for the slide 24, and the magazine is moved to the left by the distance of one compartment, so that the compartment for the slide 23 comes into the changing plane. This brings the slide 22 into the region of the brush 16, and the brush gently urges the slide 22 against the compartment wall which is most remote from the changing plane. On account of the slide 24 being situated at this time in the projection unit 5' and its corresponding compartment being empty, the brush 15 is inoperative or without effect during this last mentioned movement of the magazine. Now the push member 18 slides through the projection gate 2 and pushes the slide 23 through the slot 8 and the opening of the plastic frame 14 into the magazine compartment situated in the changing plane, in the relative location illustrated in FIG. 4. The slide 22 situated in the adjacent compartment to the right has been placed in an upright position as above indicated, by the action of the resilient flexible member 16, and thus cannot hinder the sliding of the slide 23 into its compartment, nor the removal of a slide from the compartment if it is to be gripped and moved from the magazine to projection position.

Then the magazine is automatically shifted in a rightward direction by the space of two compartments (this being the pilgrim step movement already mentioned) so that now the slide 25 comes to the changing plane. During this movement, the slide 26 is acted upon by the brush 15 and is set straight upright by this brush, against its compartment wall most remote from the changing plane. Thus the slide 26 cannot tilt into a region of the changing plane, and the gripper 17 is free to push the slide 25 out of the magazine, without hinderance, and push it into the projection gate of the projection unit 5.

In FIG. 6, there is illustrated the utility of the invention when used with single projectors rather than dual projectors, where the feeding of the magazine occurs step by step in the same direction without the reverse movement involved when pilgrim steps are used for dual projectors. In single projectors, only one slide at a time is absent from the magazine. In the case of forward projection, that is, with a rising number of the counting sequence of slides, upon forward movement of the magazine in each case the cardboard mounted slide situated in the compartments lying directly beside (that is, next in front of and next behind) the compartment situated at the changing plane, are set upright by the action of the resilient flexible members 15 and 16, and are applied against the vertical compartment walls, as illustrated in FIG. 6. In the case of reverse projection, the corresponding cardboard mounting slides are applied by the resilient flexible members against the opposite compartment walls in each case, due to the reverse movement of the magazine. In every case, no adjacent cardboard mounted slides can protrude into the changing plane and hinder the changing of slides.

It should be understood that this invention is applicable to various types of magazines. As explained in Sobotta U.S. Pat. No. 3,825,334, granted July 23, 1974, there are two general types of magazines, the bar or straight line type, and the circular or ring shaped type. The magazine guideway 11 shown in FIG. 1 of the present application is a straight guideway adapted to receive a magazine of the bar or straight line type. However, the principles of the invention are equally applicable to magazines of the circular type, since such magazines are frequently also employed with ramps for lifting the picture slides when they arrive at the slide changing plane, as illustrated by the ramp 3 in FIG. 2 of the above mentioned U.S. Pat. No. 3,790,269, and the ramp 5 in FIG. 1 of U.S. Pat. No. 3,843,247. Hence the invention is not confined to use with any particular type of magazine, but is useful in connection with any magazine where the thickness of the compartments is considerably more than the thickness of the picture slides therein, so that there is danger of the slides tilting or leaning to an interfering position.

The resilient flexible members 15 and 16 preferably each have a width, in the direction of feeding movement of the magazine, approximately equal to the thickness of each compartment in the same direction.

It has been mentioned above that the engagement of the member 15 or 16 with the edge of the slide mount serves to place the slide mount tight against the adjacent partition. It should be understood that this does not necessarily apply to the entire area of the partition. It is sufficient if the vertical edge of the slide mount engaged by the element 15 or 16 is caused to lie against the partition. The rest of the slide mount, more remote from the element 15 or 16, can remain at a slight horizontal angle to the partition, without detriment.

What is claimed is:

1. A photographic slide projector of the type comprising means for guiding a magazine for feeding movement to bring successive slide compartments to a slide changing plane and slide changing means for moving a slide out of a compartment at said plane and returning a slide to such compartment, characterized by means mounted directly on the projector and remaining in fixed relation to the projector as the magazine moves past the projector for engaging upstanding edges of slides in compartments adjacent to a compartment arriving at said plane as a result of a feeding movement of the magazine, for placing said slides in said adjacent compartments in a substantially upright position so that they will not overlie the compartment at said plane.

2. The invention of claim 1, wherein said slide engaging means comprises flexible resilient means for engaging an edge of a slide in a compartment next to the compartment which is arriving at said plane during a given feeding movement of the magazine.

3. The invention of claim 2, wherein said flexible resilient means includes two slide-engaging members, located on opposite sides of said slide changing plane.

4. The invention of claim 3, wherein said two members are in the form of brushes.

5. The invention of claim 3, wherein said two members are in the form of soft plush strips.

6. The invention of claim 3, wherein each of said slide-engaging members has a width, in the direction of feeding movement of the magazine, approximately equal to the thickness of one magazine compartment in the same direction.

7. The invention of claim 1, wherein said compartments are separated from each other by substantially vertical partitions, and wherein said slide engaging means serves to urge an upstanding edge of a slide tightly against a partition.

8. The invention of claim 1, wherein said compartments are substantially thicker, in the direction of feeding movement of the magazine, than the thickness of certain picture slides in the same direction, further comprising a ramp for raising the slides substantially above a bottom of the magazine as the slides closely approach said changing plane, the raising of the slides and the relation of the thickness of the slides to the thickness of the compartments resulting in a tendency of certain slides to tilt to an inclination partly overlying the compartments of adjacent slides.

9. A photographic slide projector having means for guiding a slide magazine for movement past a slide changing plane of the projector, the magazine having upright partitions subdividing the magazine into a series of individual compartments each having a thickness sufficient to receive a relatively thick slide mount, a relatively thin slide mount in one of said compartments being likely to tilt therein to such an extent that an upper portion of such mount, above the top of a partition against which it leans, may partially overlie a next adjacent compartment, said projector being characterized by the provision of flexible resilient means mounted on said projector near said slide changing plane in position to engage an upstanding edge of a slide mount closely approaching said plane during movement of the magazine, to shift the engaged edge of a tilted slide to an upright position lying against an adjacent partition.

10. A projector as defined in claim 9, wherein said flexible means comprises two slide-engaging members mounted on opposite sides of said slide changing plane, to straighten a tilted slide mount approaching said changing plane from either direction, regardless of the direction of feeding movement of the magazine.

* * * * *